March 1, 1960 G. V. CONSTANTAKIS 2,926,715
TIRE TREAD
Filed Nov. 23, 1956 2 Sheets-Sheet 2

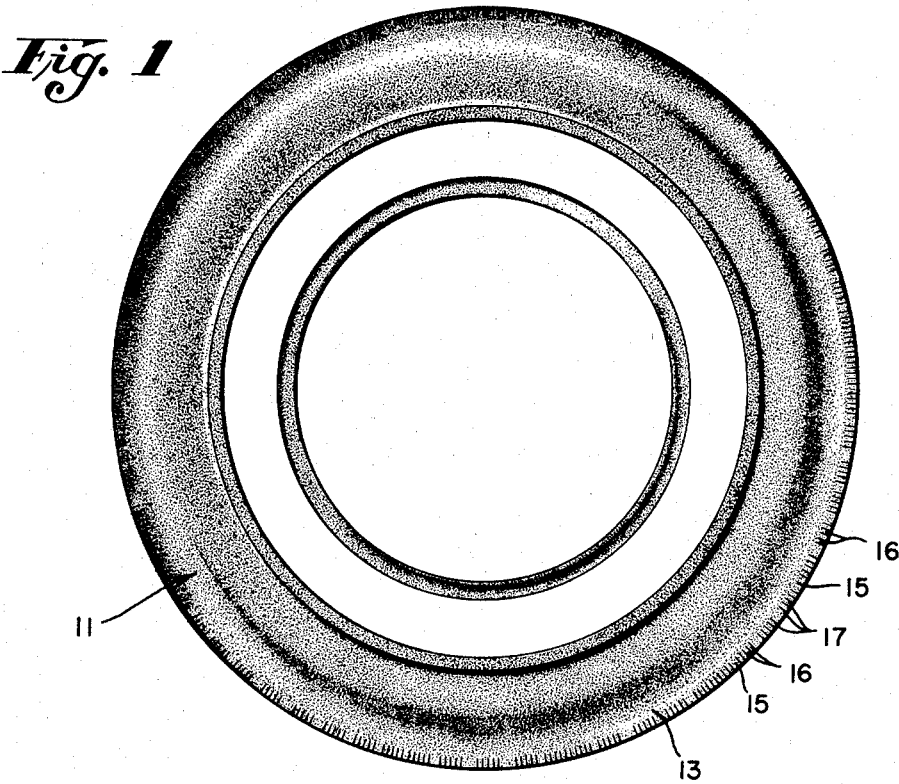
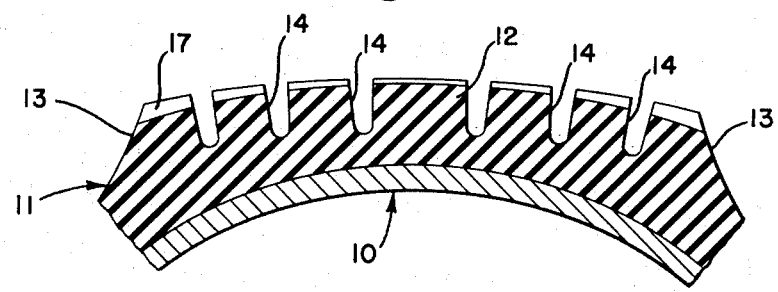

INVENTOR.
GEORGE V. CONSTANTAKIS
BY
ATTORNEY.

United States Patent Office 2,926,715
Patented Mar. 1, 1960

2,926,715

TIRE TREAD

George V. Constantakis, Allen Park, Mich., assignor to United States Rubber Company, New York, N.Y., a corporation of New Jersey Application November 23, 1956, Serial No. 623,833

6 Claims. (Cl. 152—209)

This invention relates to vehicle tires and, more particularly, to pneumatic vehicle tires having, among other things, improved traction and skid resistance characteristics.

The road engaging portion of a tire tread is designed with particular reference to its use over average road surfaces. It has been recognized for many years that tread patterns consisting of ribs, blocks, knobs and the like are not entirely effective as regards traction performance and skid resistance, especially when the road surface is wet or coated with ice or snow.

Another problem that has become important in comparatively recent years is that of tire noise at various operating speeds of passenger and other automobiles. Since the advent of smoother road pavements and automobiles having quieter engines, higher acceleration and greater braking power, the necessity of minimizing tire noise has become increasingly important.

With the view of improving traction performance, increasing skid resistance and/or reducing noise in operation, there have been a number of developments in tire tread constructions which contemplate the provision of transverse, diagonal and/or longitudinal slits in the tire tread ribs. Probably the earliest development in this field is that disclosed in J. F. Sipe Patent No. 1,452,099 which teaches providing a tire tread with uniformly spaced transverse incisions or slits that are spaced apart from three-fourths of an inch to two inches, depending on the width of the tire. Other developments include those revealed in A. W. Bull Patent No. 2,094,636 which discloses tire treads having transverse slits, diagonal slits and circumferential slits, G. G. Havens Patent No. 2,302,027 which discloses tire tread ribs having transverse slits that extend, in part, substantially to the base of the ribs, G. V. Constantakis et al. Patent No. 2,708,957, which discloses tire treads having circumferential slits formed in its ribs, and F. Herzegh Patent No. 2,716,435, which discloses a tire tread having uniformly spaced transverse slits, there being more than 12 such slits per inch measured circumferentially of the tire.

It will be noted from the foregoing that the number of transverse tread slits or incisions measured circumferentially of the tire may vary from 1 to 2 per inch, as taught by the Sipe patent, to more than 12 per inch, as disclosed in the Herzegh patent.

For the purposes of clarity, certain expressions that appear in this description are defined as follows:

"Deskidding" means the provision of not more than 3 transverse tread slits per inch measured circumferentially of the tire;

"Microsiping" means the provision of 10 or more such slits per inch; and

"Semi-microsiping" means the provision of from 4 through 9 such slits per inch.

I have discovered that tire traction performance, skid resistance and noise reduction may all be substantially improved by slitting its tread within the semi-microsiping range as will be described in detail further along herein.

In accordance with this invention, the tread is provided with a multiplicity of transverse slits, which are so spaced as to obtain a series of groups of tread segments, each group consisting of one or more major segments and one or more minor segments. The lengths of major segments, measured circumferentially of the tire, may vary. For best results, I find that the length of each major segment should be within the range of slightly greater than 1 times to 10 times the length of any minor segment in the same group. As a consequence of extensive experimentation, I have determined that the ratio of the number of minor segments to the number of major segments in a tire may vary from 0.5 to 7.0 with satisfactory results.

The height of the various segments depends to a considerable extent on the physical properties and characteristics of the tread material. For tread materials which have been in common usage this dimension preferably should not be as great as the tire antiskid depth. In any case, average minor segment height should not be less than the height of the major segment. The lengths of minor segments may vary providing that they are within the semi-microsiping range as defined above.

Each major segment is substantially more rigid than the minor segments. This differential in rigidity is attained by making the major segment length long and its height short as compared to those dimensions of minor segments. The relatively rigid major segments restrict or limit the flexing of the relatively flexible minor segments in use. As a consequence, greatest segment loss (torn segments) which occurs at maximum skid resistance in the deskidding range is avoided. With increased slits per inch, within the semi-microsiping range, strains at the bottom of the slits are progressively relieved until flexibility of the segments becomes so great, in service, that flexing strain overcomes strain relief. It has been ascertained that minimum segment loss occurs in the semi-microsiping range. Hence, by placing a relatively rigid major segment periodically in a series of relatively flexible minor segments, flexibility of the latter segment is controlled so that wet pavement skid resistance and traction are maintained at a maximum, when finer pitches which are particularly effective on snow and ice are used.

Furthermore, my combinations of major and minor segments permit extension of treatment life for any tolerance level of segment loss. Since the slit depth of the minor segment may be increased relative to the major segment until the tearing tendency in these segments is equalized, the minor segment will continue to be operative after the major segment is worn off.

In addition to improving traction performance, increasing skid resistance and reducing segment tearing, tires constructed according to this invention reduce audible noise in operation. Such noise is further reduced by using major segments of variable length.

It is the primary object of this invention to provide pneumatic tires having improved traction and skid resistance characteristics.

Another object of this invention is to reduce segment tearing in slitted tire treads.

A further object of this invention is to minimize audible noises created by a tire during use.

The enumerated objects and other objects will be apparent to persons skilled in the art from the following detailed description taken in conjunction with the accompanying drawings, in which:

Fig. 1 is a side elevation view of a pneumatic tire showing the circumferential distribution of one arrangement of transverse slits in the tread portion of the tire;

Fig. 2 is a transverse cross sectional view, in enlargement, of part of the tread portion of the tire shown in Fig. 1 and illustrates one form of the invention wherein the slit is deepest at the shoulders and graduates to a lesser depth at the crown;

Figure 3:
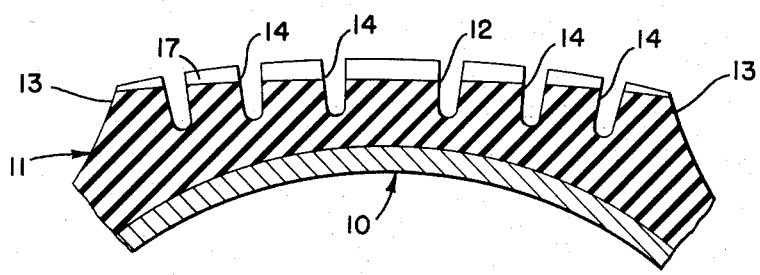
Figure 4:
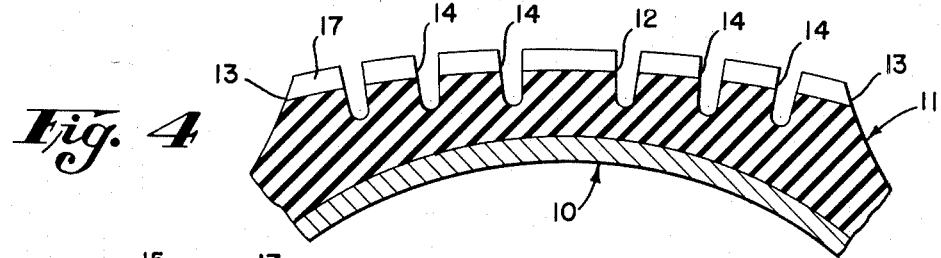
Figure 5:
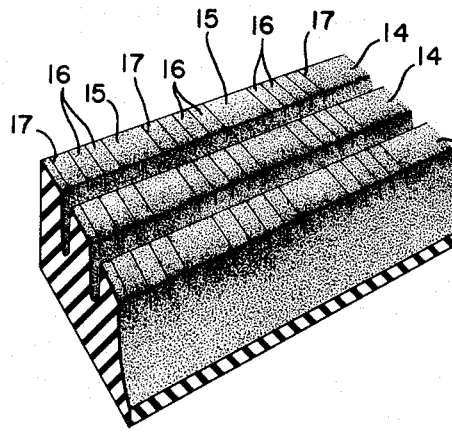
Figure 6:
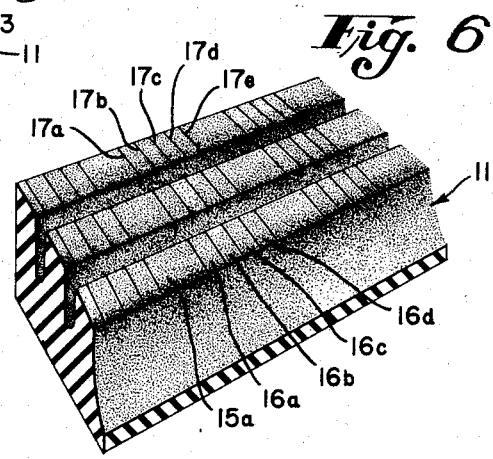

Fig. 3 corresponds to Fig. 2 and illustrates a modification wherein the slit is deepest at the crown and graduates to a lesser depth at the shoulders;

Fig. 4 also corresponds to Fig. 2 and illustrates another modification wherein the depth of the slit is constant across the tread of the tire;

Fig. 5 is a perspective view of a portion of a tire tread and illustrates a preferred circumferential distribution of slits;

Fig. 6 corresponds to Fig. 5 and illustrates a modification thereof; and

Figure 7:
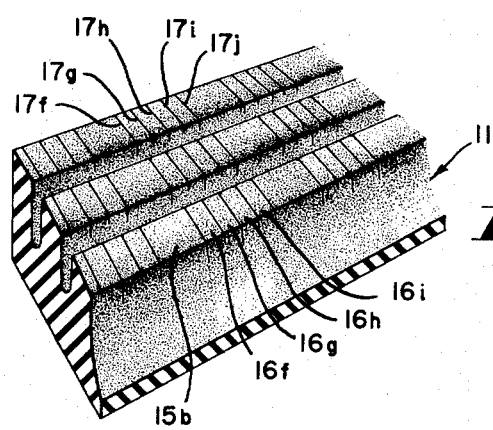

Fig. 7 also corresponds to Fig. 5 and illustrates another modification thereof.

Referring now to the drawings, wherein like reference numerals denote corresponding parts throughout the several views, I have illustrated in Figs. 1, 2 and 5 a pneumatic vehicle tire including a carcass 10 and a road-engaging tread 11 formed of rubber or rubber-like material. The tread is grooved circumferentially, as shown, to obtain a plurality of circumferential ribs, namely, a central rib 12, a pair of outer or shoulder ribs 13, and a plurality of intermediate ribs 14, between each outer rib and the central rib.

The tread ribs are provided with corresponding groups of segments, each group consisting of at least one major segment 15 and at least one minor segment 16. The segments are formed by slits 17 which are made by incising the tread transversely without substantial removal of tread material. Each segmental grouping shown in Fig. 5 consists of one major segment 15 and four minor segments 16. Thus the ratio of the number of minor segments to the number of major segments in Fig. 5 is 4.0, which is within the range mentioned above. Also the length of each major segment is in the neighborhood of 0.5" while the length of each minor is 0.2", which is within the semi-microsiping range. The height of each segment is determined by the depth of the corresponding slits and, in Figs. 2 and 5, the segments in each rib are of equal height. As best shown in Fig. 2, the slits need not be of equal depth for all ribs. Instead they may be graduated in depth, being deepest in shoulder ribs 13, less deep in intermediate ribs 14 adjacent to the shoulder ribs, even less deep in intermediate ribs 14 adjacent to central rib 12, and least deep in the central rib.

Fig. 3 is similar to Fig. 2 and illustrates a modification wherein the slits are deepest at the crown; that is, in central rib 12, and progressively less deep in other ribs.

Fig. 4 is also similar to Fig. 2 and illustrates another modification, wherein the slits are of equal depth in all ribs.

I have shown in Fig. 6 a modification of Fig. 5. This modification shows a graduation in the depth of slits as determined by the minor segment group length. In Fig. 6 the major segments are identified by numeral 15a, the minor segments by numerals 16a, 16b, 16c and 16d, and the corresponding slits by numerals 17a, 17b, 17c, 17d, and 17e. Minor segments 16a through 16d may be, and preferably are, of equal length, but vary in depth. The variation in depth of these slits is uniform, slits 17a being the deepest and 17e the shallowest.

Reference is next had to Fig. 7, which is similar to Figs. 5 and 6, but illustrates a modification thereof. In Fig. 7, the major segments are identified by numeral 15b and the minor segments by numerals 16f, 16g, 16h, and 16i. The corresponding slits are denoted by numerals 17f, 17g, 17h, 17i, and 17j. Here, again, the minor segments are preferably of equal length, alternate slits 17f, 17h and 17j preferably being of equal depth and slits 17g and 17i being of equal depth but not as deep as the other slits.

In each illustrated form of the invention the major segments and minor segments are shown as being respectively equal in length. It is to be understood that such segments need not necessarily be of respective equal lengths. It is sufficient if the minor segments in a particular group come within the semi-microsiping range.

For good results, it is recommended that: (a) the major segment length be within the range of 0.6 to 6.0 times the depth of the tire grooves, (b) the minor segment length be within the range of 0.5 to 0.1 times the major segment length, and (c) the major segment height to equal to the depth of one of the slits which is formed at the ends thereof. Thus, for a passenger automobile tire having an anti-skid depth of .36", a typical major segment length would be 1.14" and each minor segment length could be between .25" and .11". These dimensions would, of course, be proportionally increased in the case of a heavy service tire having greater anti-skid depth.

From the foregoing, it is believed that the construction and advantages of the herein described invention will be apparent to those skilled in the art, without further description. It is to be understood, however, that the invention may be embodied otherwise than as here shown and that in the illustrated forms various changes may be made without departing from the spirit, or sacrificing any of the advantages of the invention.

Having thus described my invention, what I claim and desire to protect by Letters Patent is:

1. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs and varying transversely from a minimum in the intermediate rib to a maximum in the shoulder ribs, the depths of alternate slits in each rib being equal but different from the depths of adjacent slits, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

2. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs and varying transversely from a minimum in the intermediate rib to a maximum in the shoulder ribs, circumferentially successive slits in each group of segments being uniformly graduated in depth, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

3. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs and varying transversely from a maximum in the intermediate rib to a minimum in the shoulder ribs, the depths of alternate slits in each rib being equal but different from the depths of adjacent slits, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

4. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs and varying transversely from a maximum in the intermediate rib to a minimum in the shoulder ribs, circumferentially successive slits in each group of segments being uniformly graduated in depth, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

5. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs, the depths of transversely corresponding slits in all ribs being equal, the depths of alternate slits in each rib being equal but different from the depths of adjacent slits, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

6. In a pneumatic tire, a tread made of a material, such as rubber, and comprising a plurality of circumferentially extending ribs having road-engaging surfaces and including a pair of shoulder ribs and at least one rib intermediate the shoulder ribs, said tread being provided with a series of circumferentially spaced slits extending inwardly from the road-engaging surfaces of the ribs to obtain a plurality of groups of tread segments, the depths of the slits being less than the depths of the ribs, the depths of transversely corresponding slits in all ribs being equal, circumferentially successive slits in each group of segments being uniformly graduated in depth, each of said groups including at least one major segment and a plurality of minor segments, the length of each minor segment being determined by the circumferential distance between the corresponding pair of slits which are spaced apart within the range of 4 to 9 slits per inch, the length of the major segment, which is also determined by the circumferential distance between the corresponding pair of slits, being within the range of slightly greater than 1 times to 10 times the length of any minor segment, the ratio of the total number of minor segments to the total number of major segments being within the range of 0.5 to 7.0.

References Cited in the file of this patent

UNITED STATES PATENTS

| | | |
|---|---|---|
| 2,186,180 | Sloman et al. | Jan. 8, 1940 |
| 2,690,202 | Walsh | Sept. 28, 1954 |
| 2,708,957 | Constantakis et al. | May 24, 1955 |
| 2,716,435 | Herzegh | Aug. 30, 1955 |
| 2,821,231 | Kraft | Jan. 28, 1958 |

FOREIGN PATENTS

| | | |
|---|---|---|
| 809,470 | France | Dec. 12, 1936 |